United States Patent
Kawasaki et al.

(10) Patent No.: US 6,343,153 B1
(45) Date of Patent: Jan. 29, 2002

(54) CODING COMPRESSION METHOD AND CODING COMPRESSION APPARATUS

(75) Inventors: Kojiro Kawasaki, Hirakata; Takumi Hasebe, Yawata; Kazuhiko Nakamura, Hirakata; Yoshiichiro Kashiwagi, Yawata, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/283,983

(22) Filed: Apr. 2, 1999

(30) Foreign Application Priority Data

Apr. 3, 1998 (JP) .......................................... 10-091190

(51) Int. Cl.$^7$ ................................................ G06K 9/36
(52) U.S. Cl. ...................................... 382/239; 382/232
(58) Field of Search ................................ 382/239, 232, 382/236; 348/401.1, 402.1, 409.1, 406.1, 407.1

(56) References Cited

U.S. PATENT DOCUMENTS

| | | | | |
|---|---|---|---|---|
| 5,710,595 A | * | 1/1998 | Hang et al. | 348/419 |
| 5,790,196 A | * | 8/1998 | Sun et al. | 348/419 |
| 5,821,986 A | * | 10/1998 | Yuan et al. | 348/17 |
| 5,878,166 A | * | 3/1999 | Legall | 382/232 |
| 6,040,861 A | * | 3/2000 | Boroczky et al. | 382/239 |

* cited by examiner

Primary Examiner—Yon J. Couso
(74) Attorney, Agent, or Firm—Wenderoth, Lind & Ponack, L.L.P.

(57) ABSTRACT

A coding compression method for encoding the video image signal with a variable bit rate includes performing coding to the video image signal for each predetermined coding unit in accordance with a predetermined first coding parameter, which coding is completed within the coding unit, thereby generating a first coded stream, calculating a second coding parameter of the video image signal for each the predetermined coding unit while generating the first coded stream, indicating a partial section of the first coded stream, the partial section comprising the predetermined coding units, editing the second coding parameters corresponding to the designated subsections, performing coding to the video image signal of the designated subsections in accordance with the edited second coding parameters thereby to produce a second coded stream, and replacing a partial section of the first coded stream with at least a partial section of the second coded stream, the partial section of the second coded stream corresponding to the partial section of the first coded stream.

12 Claims, 17 Drawing Sheets

Fig.12 (a)
film video image
Fig.12 (b)
television-cinema video image
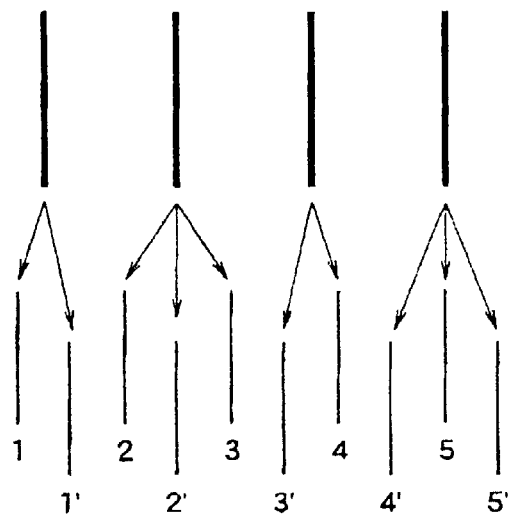
Fig.12 (c)
inverse television-cinema video image 1
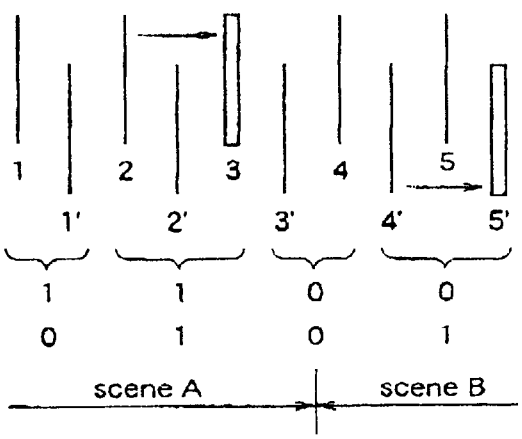
Fig.12 (d)
inverse television-cinema video image 2
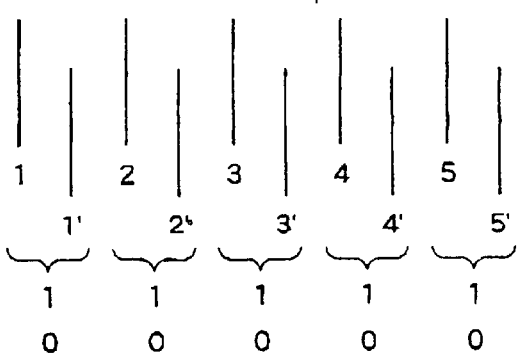

CODING COMPRESSION METHOD AND CODING COMPRESSION APPARATUS

FIELD OF THE INVENTION

The present invention relates to a high efficiency coding method of a moving video image signal and, more particularly, to a coding compression method which is appropriate for a storage media such as an optical disk.

BACKGROUND OF THE INVENTION

Generally, when the video image data is stored as it is, it requires a memory of a tremendously large capacity Accordingly, a technology of storing video image data in a media with efficiently compressing the video image data becomes that of a great importance.

On the other hand, from an optical disk, usually, video image data of constant rate is reproduced as seen in CD or LD. However, there are generally a video image of a scene including a large quantity of information and a video image of a scene including not so large quantity of information As a coding method effectively utilizing this nature of video image, there is proposed a variable bit rate coding method (as disclosed in Japanese laid-open publication No. Hei. 7-284097).

At first, a video image coding circuit which is generally used in MPEG will be described with reference to FIG. 13. The coding circuit 2 in FIG. 13 compresses data using the motion compensation DCT method. The motion compensation DCT method is a method of transmitting one frame which is periodically selected from the input video image with compressing the same by using only the data in that frame, and transmitting the remaining frame with compressing the difference between that frame and the previous frame. For the intra-frame compression and inter-frame compression, a discrete cosine transform as a kind of orthogonal base transformation is employed. In addition, when calculating the difference between frames, detecting the motion vector of the video image among the previous frames, and taking the difference after the motions being corrected, whereby the compression rate is enhanced to a great extent.

Hereinafter, the operation of the coding circuit 2 in FIG. 13 will be described in more detail. In FIG. 13, the real lines show flows of data, and dotted lines show flows of control.

The video image data input from the input terminal 30 is stored in the frame buffer 25, and thereafter, reordered in the coding order by the frame reordering circuit 26. The subtracter 10 is used for calculating the difference from the previous frame. The coding control circuit 22 controls the on and off of the refresh switches 23 and 24 in accordance with the type of the pictures to be processed. In other words, the coding control circuit 22 switches of f the refresh switches 23 and 24 (performs in-frame compression) when the pictures to be processed are I pictures (intra-pictures). As a result, the subtracter 10 will not operate.

The input video image data is DCT converted by the DCT conversion circuit 11. The DCT is usually performed two-dimensionally. When the DCT is to be performed for each 8×8 blocks, it results in 8×8 pieces of coefficients. The data to which DCT is performed is originally continuous quantity, but because the operation is performed using digital circuits, 64 pieces of coefficients are obtained as digital values of a predetermined bit width. This data is subjected to appropriate bit allocation for each frequency component by a quantization circuit 12. In general, low band component is subjected to a large number of bit allocation because low band component is important for constituting a video image, and high band component is subjected to a small number of bit allocation because high band component is not so important for constituting a video image. A variable length coding (VLC) circuit 13 performs variable length coding of the output of the quantization circuit 12. The variable length coding is a method of allocating a shorter code length to data, which has statistically higher appearance probability, and this method enables to remove the statistically redundant component included in the data. In this method, Huffmann code is often used.

An inverse quantization circuit 15 reverses the quantization of the output of the quantization circuit 12. In contrast to the quantization, the inverse quantization circuit 15 restores the amplitude of each frequency component. Each coefficient restored to the original amplitude by the inverse quantization circuit 15 is restored to the original video image data by the inverse DCT circuit 16. When the restored video image data is intra-frame video image data, an adder 17 will not operate. Thereafter, the restored video image data is delayed by a predetermined number of frames by a frame memory 18. The delayed video image data is input to a motion vector detecting circuit 20. The motion vector detecting circuit 20 calculates a motion amount from the input video image data. A motion compensation circuit 19 moves the place of the video data image in accordance with the motion amount. Thus, the video image data subjected to a motion compensation is used to calculate the difference from the next video image data by the subtracter 10.

The video image of some frames followed by I picture are used for compressing the difference from the video image data of the former frame. A coding control circuit 22 switches the refresh switch 23 or 24 on in case where the picture to be processed is P picture or B picture (intra-frame compression). The refresh switch 23 is switched on in calculating the difference between frames and is used for operating the subtracter 10.

The refresh switch 24 is repeatedly switched on or off alternatively with the refresh switch 23 at a predetermined period. When it is switched on, it is used to operate adder 17 to add the different data between the frames and the former frame data, and is used to restore the frame. A variable length coding circuit 13 also performs the variable length coding to the inter-frame compression data.

Here, a group from I picture before the next I picture is called 1 GOP (Group of Picture), and it is usually constituted from the video image signal having about 15 frames (about 0.5 second).

The output of a variable length coding circuit (VLC) 13 is output through the buffer circuit 14 to an output terminal 31. The quantization scale decision circuit 21 indicates, viewing the state of the buffer circuit 14, a quantization scale to the quantization circuit 12. To be specific, when it is assumed that a video image signal is output from the buffer circuit 14 at a prescribed constant rate, when the data left in the buffer circuit 14 is small, it is necessary to generate a large amount of data, and therefore, the quantization scale Q is controlled to be smaller than before, thereby to increase the number of the generated bit amount. On the contrary, when the data left in the buffer circuit 14 is too large, it is necessary to make it difficult to generate data, and therefore the quantization scale Q is controlled to become larger than before, thereby to decrease the number of generated bit.

To be specific, the target data amount which is a data amount to be generated in the next section is calculated from the buffer residual quantity, and then the quantization scale is calculated from the target data amount. When the target data amount is large, the quantization scale Q is required to be small, while when the target data amount is small, the quantization scale Q large. In short, the target data amount and the quantization scale are in a relation of inverse proportion.

The target data amount for each section of the video image signal is calculated in advance to be stored in the quantization scale decision circuit 21, and the target data amount is compulsorily and successively changed for each short section while performing coding, whereby a variable bit rate control is realized, In FIG. 14, the description of the variable bit rate control of two-path system, which is usually employed, is given. The first path inputs the prescribed video image signal such as 2 hours video image signal from the terminal 1, and then performs the first coding in the coding circuit 2. The coding circuit 2 is the same as that in the FIG. 2, while the feedback loop from the buffer circuit 14 to the quantization circuit 12 is omitted. To be specific, regardless that of the generated data amount is large or small, the quantization scale Q1 decided in the quantization scale decision circuit is made at a fixed value. However it may be fixed independently for each picture.

The generated data amount D1 resulted therefrom is stored in a storage circuit 3 for each short section such as for each 2 GOP. Examples of the generated data amount D1 and the target data amount D2, are shown as a simple model in FIG. 15(A) and (B).

The abscissa represents GOP and the ordinate represents the generated data amount. Section A shows a standard video image, Section B shows a video image having a small amount of motions, which is easy to be coded, and Section C shows a video image of a large amount of motions, which is difficult to be coded. When assumed that the time length of each section is one third of the whole time length, the ratio between the sum of the generated data amount D1 generated in each section becomes A:B:C=2:1:3. Here, while the value on the ordinate itself depends on the quantization scale Q1, in the present invention, the relative ratios between respective sections are more important than the value on the ordinate itself.

In case where the whole capacity of an optical disk, DALL is considered as 3-gigabyte, the allocated amount to the section A is calculated as 3-gigabyte/6×2=1-gigabyte. In the same way, the section B is calculated as 0.5-gigabyte and the section C is calculated as 1.5-gigabyte.

In general, in case where the generated data amount of the short section which is generated in the first path is regarded as D1, the sum of the data amount D1 is ΣD1, the target data amount as D2, and the whole capacity as DALL, the target data amount D2 of each section is calculated by D2=D1×DALL/ΣD1.

Thus, it can be easily performed by the calculation to divide the video image signal such as 2 hours video image signal in short sections of each 2 GOP (1 second), and allocate the same such that each target data amount D2 should be approximately in proportion to the generated data amount D1 stored in said storage circuit 3 and that the sum of each target data amount D2 be the whole sum of the optical disk, DALL.

The target data amount decision circuit 4 in FIG. 14, thus calculates the target data amount based on the information of the generation code amount storage circuit 3. The target data amount of each short section decided in the target data amount decision circuit 4 is stored in the target data amount storage circuit 5.

Next, in the second path, the same video image signal of the first path is input from the terminal 1 in FIG. 14 and coding is performed Thus, a target data amount storage circuit 5 feeds the target data amount calculated in advance to a coding circuit 2a. The coding circuit 2a, which is almost same as that in FIG. 13, is constructed such that a quantization scale decision circuit 21 can receive the instruction from the target data amount storage circuit 5.

With such construction, the code amount is allocated to each section in accordance with the difficulty of coding for respective short sections detected in the first coding, and therefore a coding with compression appropriate for a storage media is realized.

The above-described prior art is a method for efficiently recording the moving video image data in a storage media such as an optical disk by the variable bit rate control. However it is difficult to perform optimum coding in consideration of human visual characteristic only with the information concerning input video image obtained by the first coding as well as the target coding compression condition calculated automatically from the result of the first coding. In addition, there is a problem that coding itself requires a lot of time and expense since at least twice codings are required. Further, when some faults such as errors due to dropouts are found partially in the input video image signal after the coding, re-coding of whole video image signal already coded is also required, resulting in a large inefficiency.

SUMMARY OF THE INVENTION

According to a first aspect of the present invention, a first coding is performed by variable bit rate control, the target coding compression condition which is obtained from the result of the first coding is edited, and a second coding is performed on the basis of the edited target coding compression condition, thereby resulting in coding in consideration of human visual characteristics and psychological characteristics.

Therefore, it is also possible to improve the whole coding efficiency to a large extent since second coding is performed only to partial sections where the target coding compression condition is edited.

According to the second aspect of the present invention, when the GOP structure and the inverse television-cinema conversion structure of the target coding condition are changed, the target generation code amount in the second coding is adaptively predicted from the target coding condition before and after the changes thereof, whereby the optimum coding allocation is realized, and the quality of the video image is improved.

BRIEF DESCRIPTION OF THE DRAWINGS

FIG. 12 is an explanatory drawing according to the seventh embodiment of the present invention.

DETAILED DESCRIPTION OF THE PREFERRED EMBODIMENTS (Embodiment 1)

Figure 16:
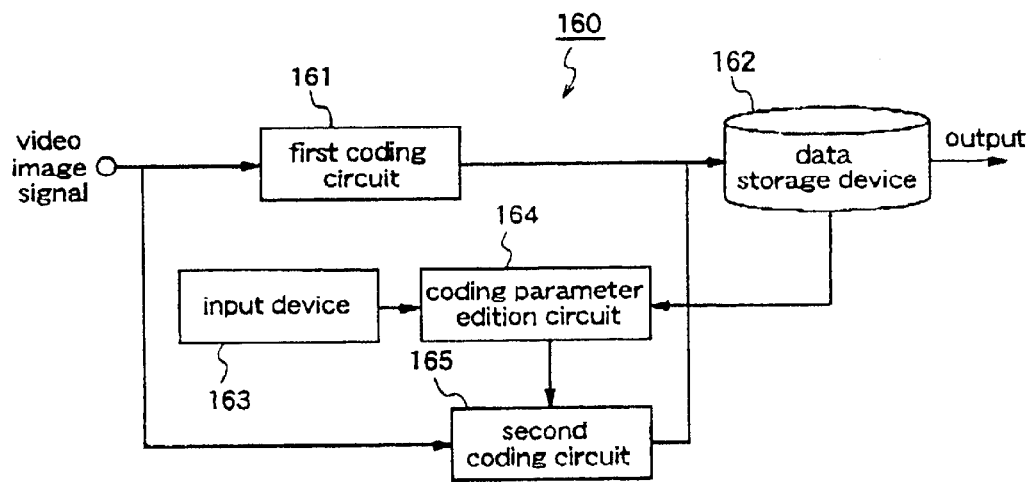
FIG. 16 is a block diagram illustrating conceptually a basic structure of the present invention.

FIG. 16 is a block diagram for illustrating conceptually a basic structure of the present invention. In the figure, the numeral 160 designates a coding compression apparatus, the numeral 161 designates a first coding circuit for performing variable length coding of the input video image signal, the numeral 162 designates a data storage means for storing a divided coded stream generated in a first coding 161, a coding parameter such as generation code amount, quantization scale and a divided coded stream generated in the second coding circuit, which is described later, the numeral 164 designates a coding parameter edition circuit which reads a coding parameter edition circuit of the concerned section from the data storage means 162 to the data of the section which a user is not satisfied with the video image quality, and edits the same by an edition command input from the input means 163, and output a parameter in coding in the second coding circuit 165.

Figure 18:
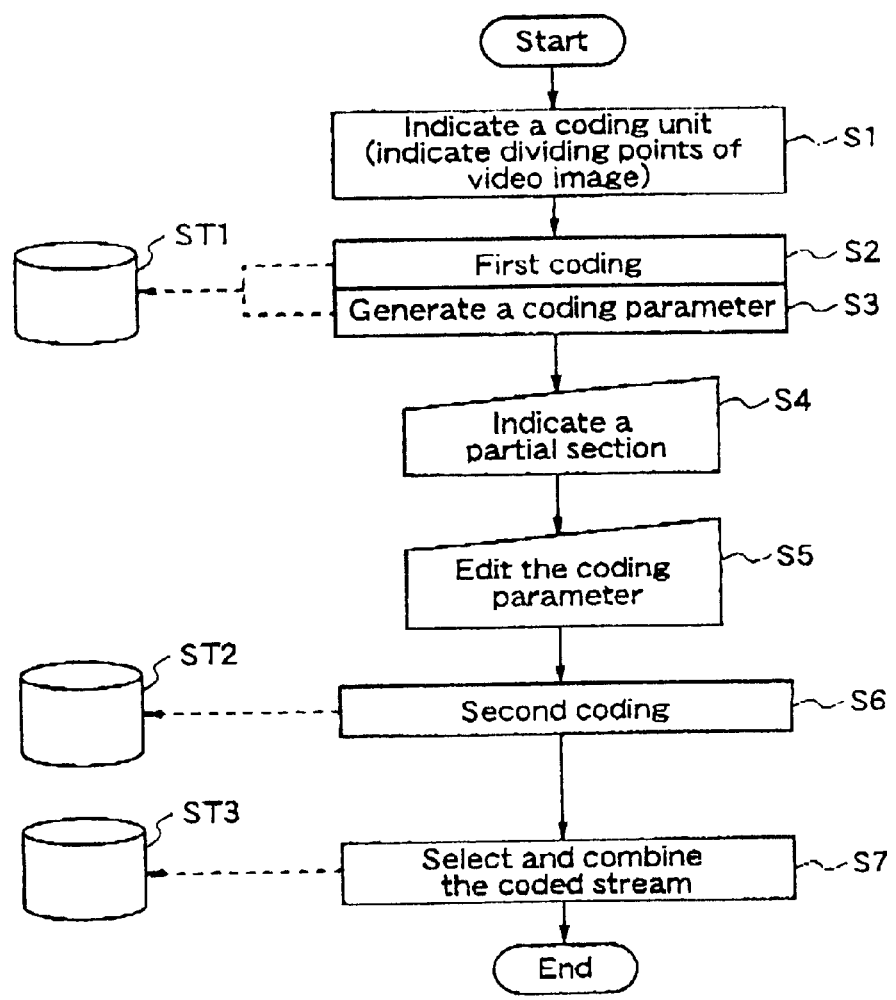
FIG. 18 is a flow chart illustrating a basic operation by a coding compression apparatus of the present invention.

FIG. 18 is a flowchart for generating a final coding stream.

In FIG. 18, at first, a dividing point is set to divide an input video image signal for each predetermined coding unit (step S1). Next, a divided coded stream is generated for each coding unit by the first coding (step S2), at the same time a coding parameter such as modulation intensity of a quantization step, quantization matrix, degree of modulation of pixel level, search range of motion vector, detection condition of motion vector, and target code amount are stored in a first storage means ST1 (stop S3). An operator indicates a partial section where no satisfactory video image quality could be obtained by the first coding (step S4), and edits the coding parameter for that partial section (step S5). A new divided coded stream is generated for this indicated partial section by a second coding, and stored in a second storage means ST2 (step S6). In addition, a final coded stream is generated by combining a new divided coded stream generated by the second coding for the partial section where no satisfactory video image quality could be obtained by the first coding and a divided coded stream generated by the first coding for the other partial section (step S7) and is stored in a third storage circuit ST3.

Figure 17:
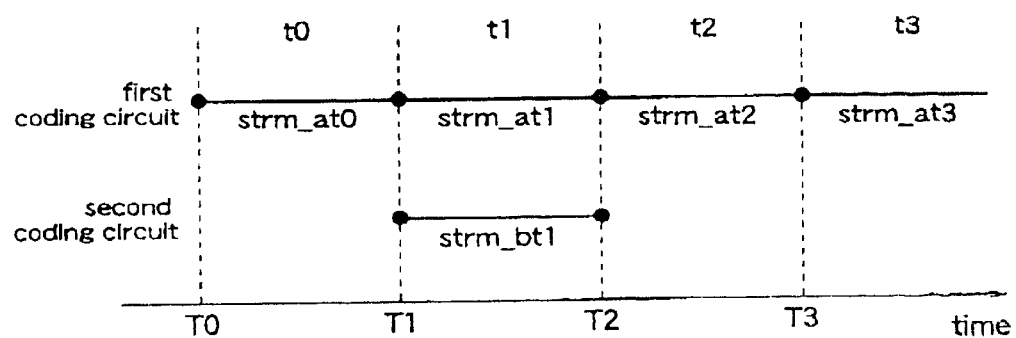
FIG. 17 is a diagram explaining a basic operation by a coding compression apparatus of the present invention.

For example, as shown in FIG. 17, in case of generating a divided coded stream of strm_at0 to strm_at3 in the first coding circuit 161 to the divided section t0 to t3, and generating a coded stream of strm_bt1 from the second coding circuit 165 to the section t1 where the video image quality is not efficient, a final coded stream output from the data storing apparatus 162 is obtained by connecting strm_at0, strm_bt1, strm_at2 and strm_at3.

Figure 1:
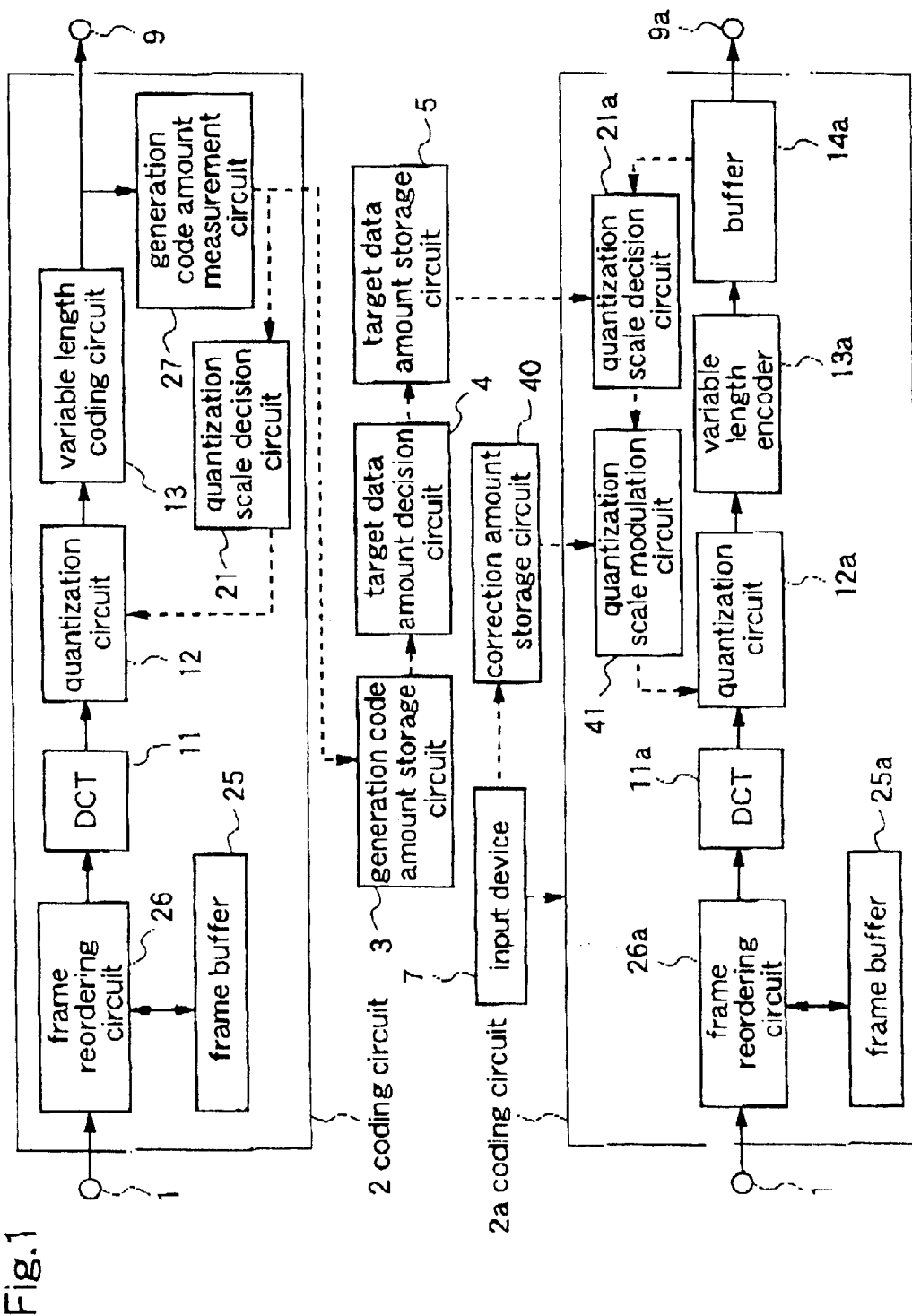
FIG. 1 is a block diagram illustrating a coding compression apparatus according to the first embodiment of the present invention.

FIG. 1 is a block diagram illustrating an example of a coding compression apparatus according to the first embodiment of the present invention. At first, the description of a first coding is given. In a first coding, a coded stream 9 output from a variable length coding circuit 13 is output as a result of a first coding from a coding circuit in the coding circuit 2, and it is input to generation code amount measurement circuit 27 in concurrence with being stored in a data storage means such as a hard disk means In a generation code amount measurement circuit, an error between a predetermined average bit rate and the bit rate of the actual coding results in a predetermined period in the past, and is output to a quantization scale decision circuit 21. In the quantization scale decision circuit 21, quantization scale is decided so as to reduce the error from the average bit rate and the error from the predetermined maximum rate and minimum rate.

For example, in case where a complex video image continues and the coded bit rate generated from the result of the actual coding becomes large, and the error is increased to the positive direction, the quantization scale is increased to prevent the increase of errors. On the contrary, in case where a simple video image continues, the actual coded bit rate becomes small, and the error is increased to the negative direction, a quantization scale is decreased so as to enlarge the coding bit rate. At this time, the quantization scale is decided considering the behavior of a virtual buffer so as to simultaneously satisfy either or both of the predetermined maximum rate or/and minimum rate.

If a predetermined period in the past is fixed longer to some extent, the quantization scale is considered almost fixed locally, and the bit rate becomes variable in accordance with the activity of the video image and at the same time, the predetermined average rate is satisfied in view of a sufficient time length.

In addition, in a first coding, a generating coded stream is supposed to be divided in advance at the specified point of an input video image, such as the starting point of each chapter constituting a cinema, the scene change point detected from the variation of a difference value among frames or an error value of a motion vector, on the point of a predetermined period. To be specific, coding is performed such that a former GOP is finished at the frame just before the input video image frame corresponding to the division point and that a new GOP starts from the frame corresponding to the dividing point. At this time, as the newly starting GOP, a closed GOP for which coding is performed without referring the video image of the preceding GOP is adopted.

The divided coded stream which is thus generated by the first coding with variable bit rate control is stored in a data storage means such as a hard disk means In addition, coding parameters such as a generation code amount and a quantization scale are also stored in a form corresponding to the divided coded stream in the data storage means such as a hard disk means.

Next, the second coding will be described.

A second coding is performed to the section where the video image quality in the first coding is not satisfactory to newly generate a coded stream. As for the other sections, the coded stream generated in the first coding are used as they are.

Next, the process of editing the target coding condition will be described.

An operator gives indications of the section where a second coding is to be performed and the correction amount of the modulation intensity of quantization step decided by the quantization scale decision circuit 21 in that section from an input means 7. The correction amount of the modulation intensity is stored by a correction amount storage circuit 40. A quantization scale modulation circuit 41 changes the modulation intensity in accordance with the indication.

In general, a modulation of quantization scale is performed in accordance with the activity of an input image. If an activity of the j-th macro book is regarded as ACT (j), that Normalized by an activities of the former frames is regarded as N__ACT (j), the average of ACT (j) in a picture preceding by one is regarded as AVG__ACT, a weighting coefficient in the modulation is regarded as N, the following formula stands;

$$N\_ACT (j)=(N*ACT (j)+AVG\_ACT)/(ACT (j)+N*AVG\_ACT)$$

The operator can lead the modulation intensity to the most appropriate value by indicating value of N. While the AVG__ACT is generally obtained by taking an average of the ACT (j) of in the picture preceding by one picture, the operator can indicate to take an average over a plurality of former pictures, which results in the degree of the quantization, step being smoothed, and prevents the quantization scale being prevented from varying steeply even when the activity is changed steeply. As a result, a steep variation of video image quality can be suppressed.

In addition, the operator can indicate not only amendment of the modulation intensity but not performing the modulation itself.

As described above, the target coding compression condition is subjected to editing processing. A second coding is performed to a partial section including a partial section in which the edition of the target coding compression is performed.

Thereby, the operator can perform the modulation of quantization step for a partial section where no satisfactory video image quality could be obtained by an automatic allocation and the most appropriate coding in view of visual characteristic of human being in addition, by performing a second coding only to the problematic section and employing the coded streams which are generated in the first coding as they are for the other sections, it is possible to save the time as a total for coding compression.

(Embodiment 2)

Figure 2:
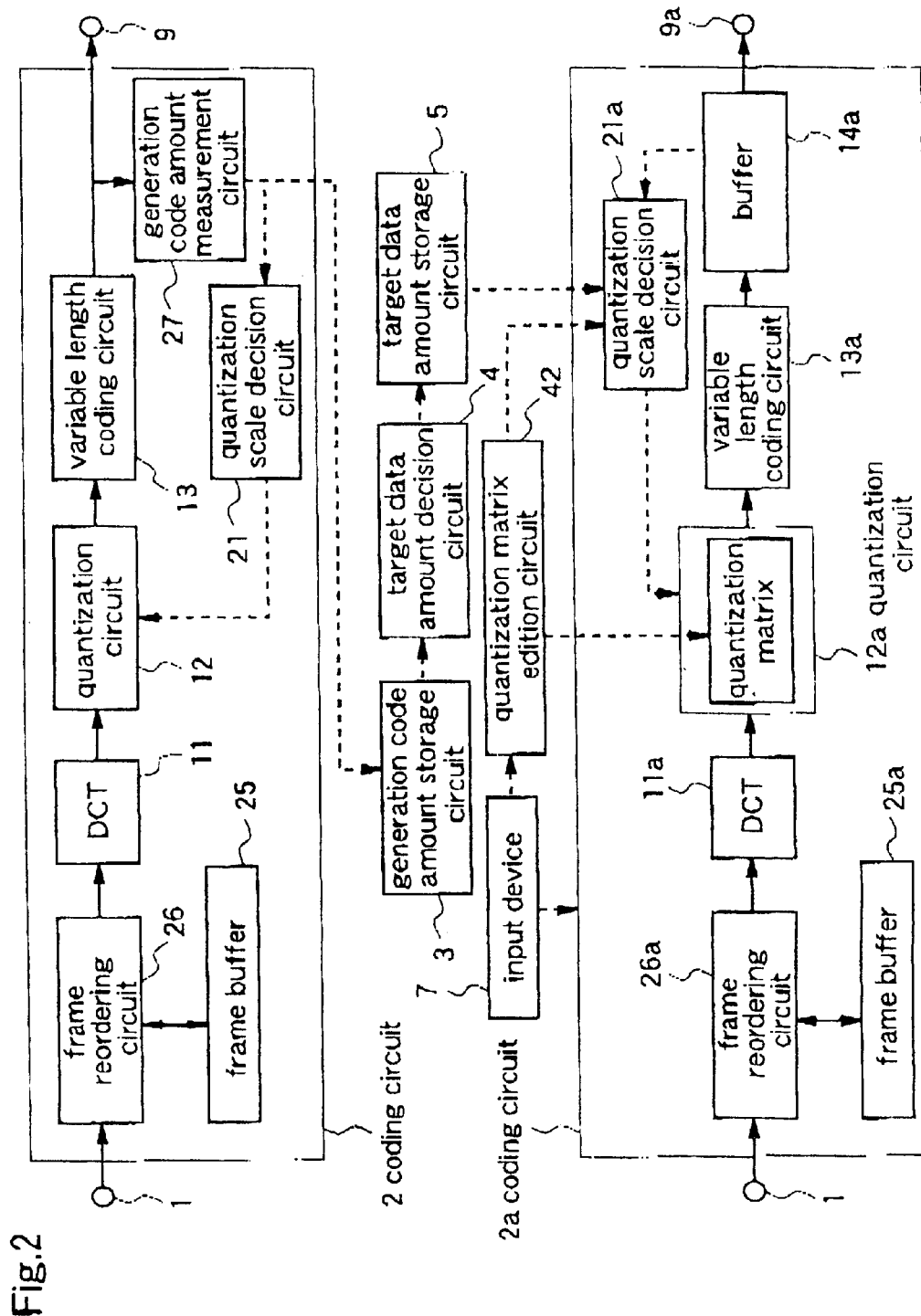
FIG. 2 is a block diagram illustrating a coding compression apparatus according to the second embodiment of the present invention.

FIG. 2 is a block diagram illustrating an example of a coding compression apparatus according to the second embodiment.

This second embodiment is different from the first embodiment shown in FIG. 1 including a quantization matrix edition circuit 42, for which the operator can edit a quantization matrix provided in the quantization circuit 12a by an input through the input means, and which alto edits the quantization scale in cooperation with the edition of the quantization matrix.

This second embodiment is different from the first embodiment only in the editing process and the first coding and the second coding are the same as in the first embodiment.

Hereinafter, the editing processing of the quantization matrix in this second embodiment will be described.

For example, in ease where the original quantization level is small, and if the quantization level is varied directly, the level changes largely, and as a result, there arises affections on visual sense of human being by quantization distortions, the operator can perform editing the quantization matrix to that section, thereby to decrease the quantization matrix values as a whole, thereby to increase the scale of the quantization step.

It is, of course, also possible to control the quantization matrix values of the particular frequency components.

In addition, in place of editing each quantization matrix value, it is also possible to provide a plurality of quantization matrix tables in advance so that the operator should select one from them in accordance with a signal input through an input means.

Thus, the operator performs edition of quantization matrix for the partial section where no satisfactory video image quality could be obtained by an automatic allocation, thereby providing a coding compression apparatus appropriate for improvement of video image in intra-frame compression.

(Embodiment 3)

Figure 3:
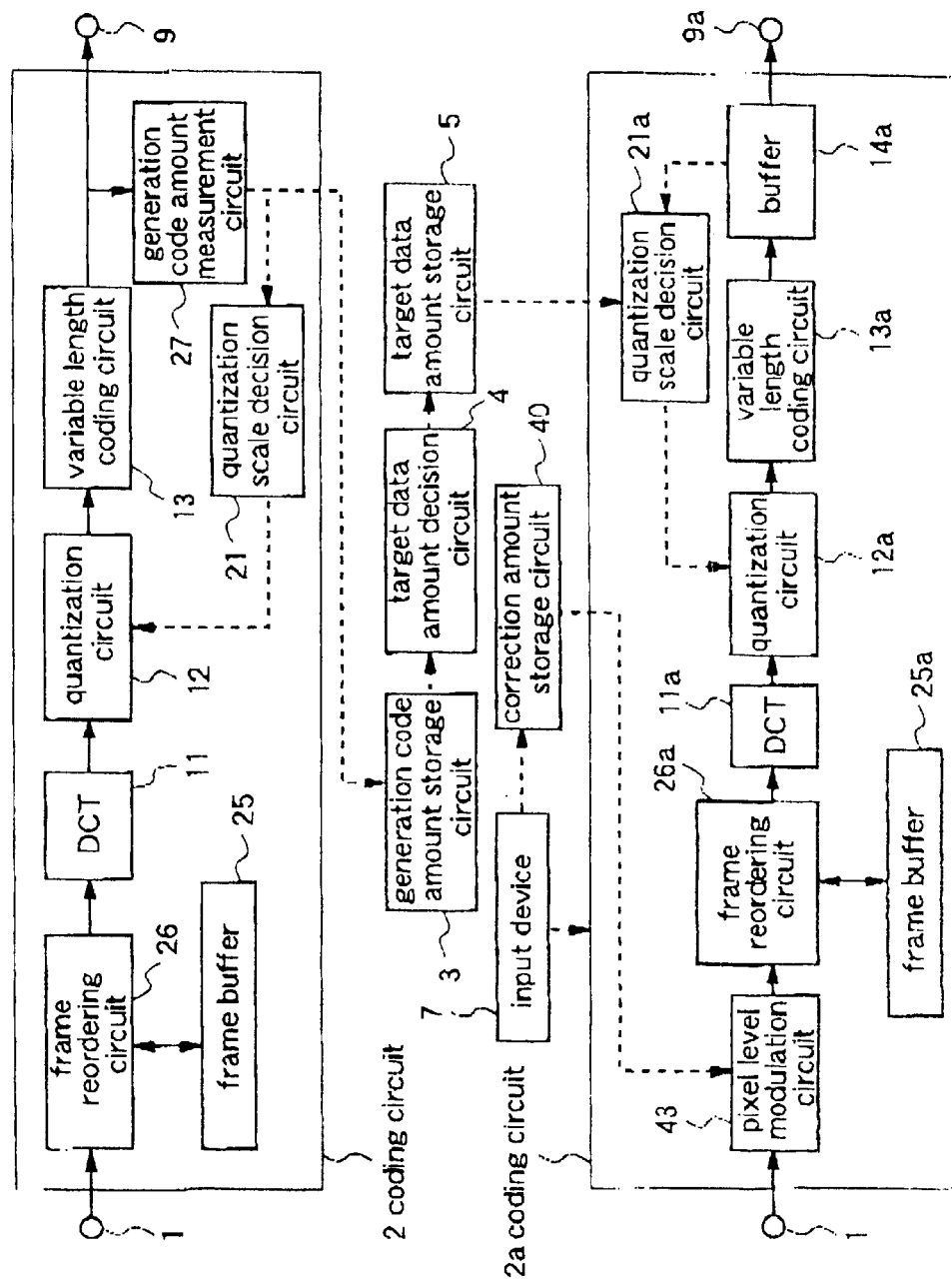
FIG. 3 is a block diagram illustrating a coding compression apparatus according to the third embodiment of the present invention.

FIG. 3 is a block diagram illustrating an example of a coding compression apparatus according to the third embodiment of the present invention.

This third embodiment is different from the first embodiment shown in FIG. 1 in that a pixel level modulation circuit 43, which performs modulation to each pixel level of the input video image signal, is provided, and the correction amount storage circuit 40 functions to correct this pixel level modulation circuit 43.

This third embodiment is different from the first embodiment only in the editing process, and the first coding and the second coding are the same as the first embodiment.

Hereinafter, editing processing of the pixel level modulation in this third embodiment will be described.

Figure 4:
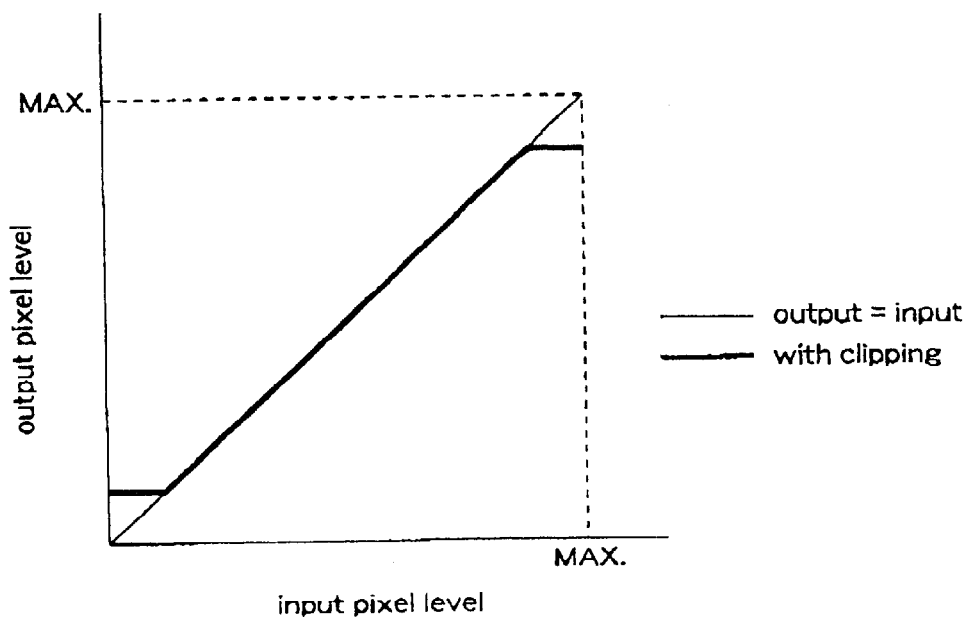
FIG. 4 is an explanatory drawing of the third embodiment of the present invention.

In general, since a human visual characteristic has a low resolution where the brightness level is particularly high or low, even clipping of parts of the human visual characteristic having a brightness level beyond a constant brightness presents not so large affections, and the coding generation bit amount can be suppressed with the spatial frequency being suppressed in these bands. As a result, it is possible to allocate a lower number of bits to bands which require a large number of bits allocated. FIG. 4 shows a diagram for a modulation circuit having such input and output characteristic.

In addition, the instruction of the pixel level modulation, can be realized not by editing the modulation values of the respective levels, but by providing a plurality of pixel level modulation value tables in advance so that the operator should select one from them in accordance with a signal input through an input means. The above description is of the editing processing in this third embodiment of the present invention.

In addition, while the pixel level modulation circuit 43 is placed in the former stage of the frame reordering circuit 26a in the above description, this circuit may be placed in the later stage of the frame reordering circuit 26a.

In this way, the operator instructs the pixel level modulation for the partial section where no satisfactory video image quality could be obtained by the automatic allocation, thereby providing a coding compression apparatus which is appropriate for improvement of video image in intra-frame compression.

(Embodiment 4)

A coding compression apparatus according to a fourth embodiment of the present invention will be described with reference to the FIG. 5 and FIG. 6.

Figure 5:
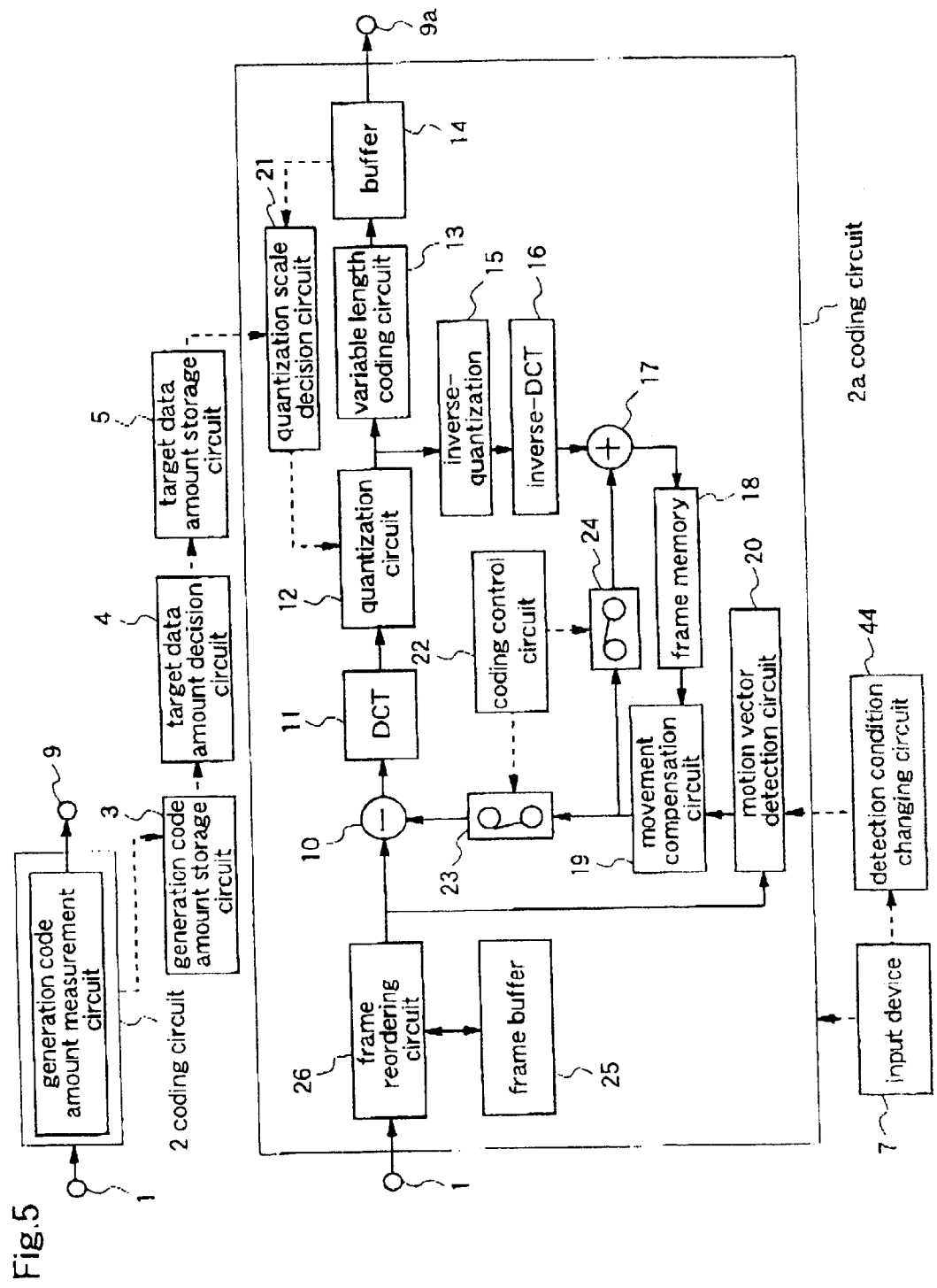
FIG. 5 is a block diagram illustrating a coding compression apparatus according to the fourth embodiment of the present invention.

FIG. 5 is a block diagram illustrating an example of a coding compression apparatus according to this fourth embodiment of the present invention.

This fourth embodiment is different from the first embodiment shown in FIG. 1 in that there is provided a detection condition modifying circuit 44 for modifying the detection condition of the motion vector detecting circuit 20 and that the operator can input the detection condition of the motion vector detection circuit 20 through an input means 7.

Figure 6:
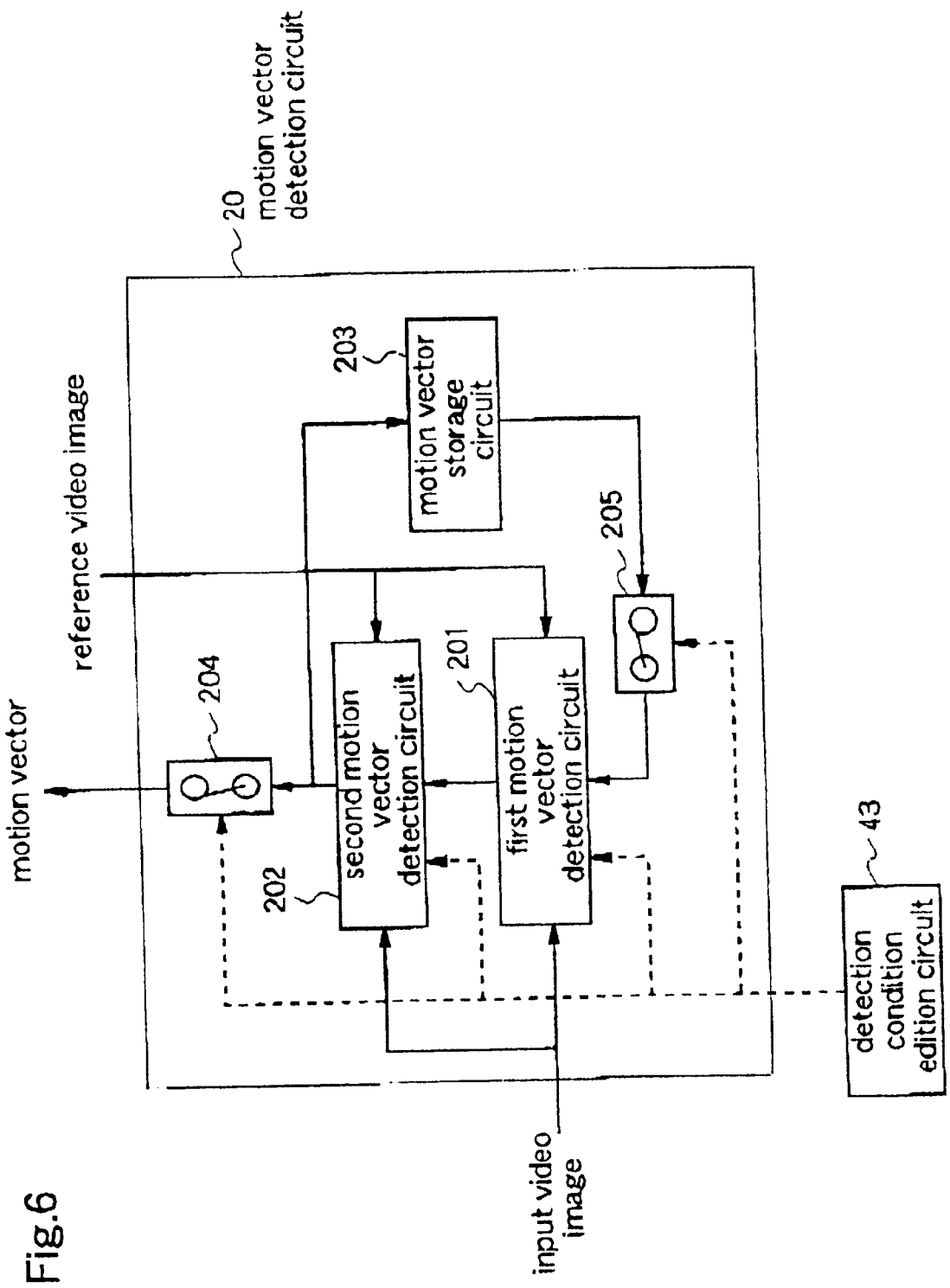
FIG. 6 is a block diagram illustrating a motion vector detecting circuit according to the fourth embodiment of the present invention.

FIG. 6 is a block diagram illustrating an example of a motion vector detection circuit 20. By adopting a two-stage construction in which the motion vector is further performed by a standard motion vector detecting circuit 202 on the basis of the first motion vector detected by the first motion vector detection circuit 201, it is possible to detect a motion vector in a wider range. A switch 204 is employed to compulsorily make the motion vector zero by switching the same off. In general, since a motion vector of video image is highly correlated between successive frames, holding a motion vector detected from a former frame in the vector storage circuit 203, and employing the same as a standard motion vector for the first motion vector detection circuit in the next frame, results in apparently enlarging the detecting range. This enables detection of a highly related motion vector when a switch 205 is turned off, it is possible to prohibit the use of this standard motion vector.

In addition, by performing sub-sampling of an input and a reference video image, and detecting a first motion vector in a wide range for the sub-sampled video image in the first motion vector detection circuit 201, and performing a motion vector detection into details with employing the first motion vector as a reference in the second motion vector detection circuit 202, detection of a motion vector in a wider range can be performed.

In a coding compression apparatus having such a structure, the motion vector detection condition in the partial section where no satisfactory video image quality could be obtained in the first coding is changed, and a second coding is performed for that section.

The editing process in this fourth embodiment of the present invention will be described.

For example, when it is indicated that for heavily moving video images, the motion vector which is detected in the previous frame is employed as a reference motion vector in the first motion vector detection circuit, and further the sub-sampled video images are employed as the input and reference video image, the detection of a motion vector from a wider searching range is made possible. On the contrary, when it is indicated that for less motion video images, the motion vector which is detected in the previous frame is not employed and the sub-sampling is not employed a high accuracy motion vector search is made possible while the search range is narrowed.

In this way, the operator can perform edition of the condition or the motion vector detection for the partial section for which no satisfactory video image quality could be obtained by an automatic allocation, whereby the spatial and temporal redundancy in the detection of the motion vector are reduced to enable an optimum coding.

(Embodiment 5)

Figure 7:
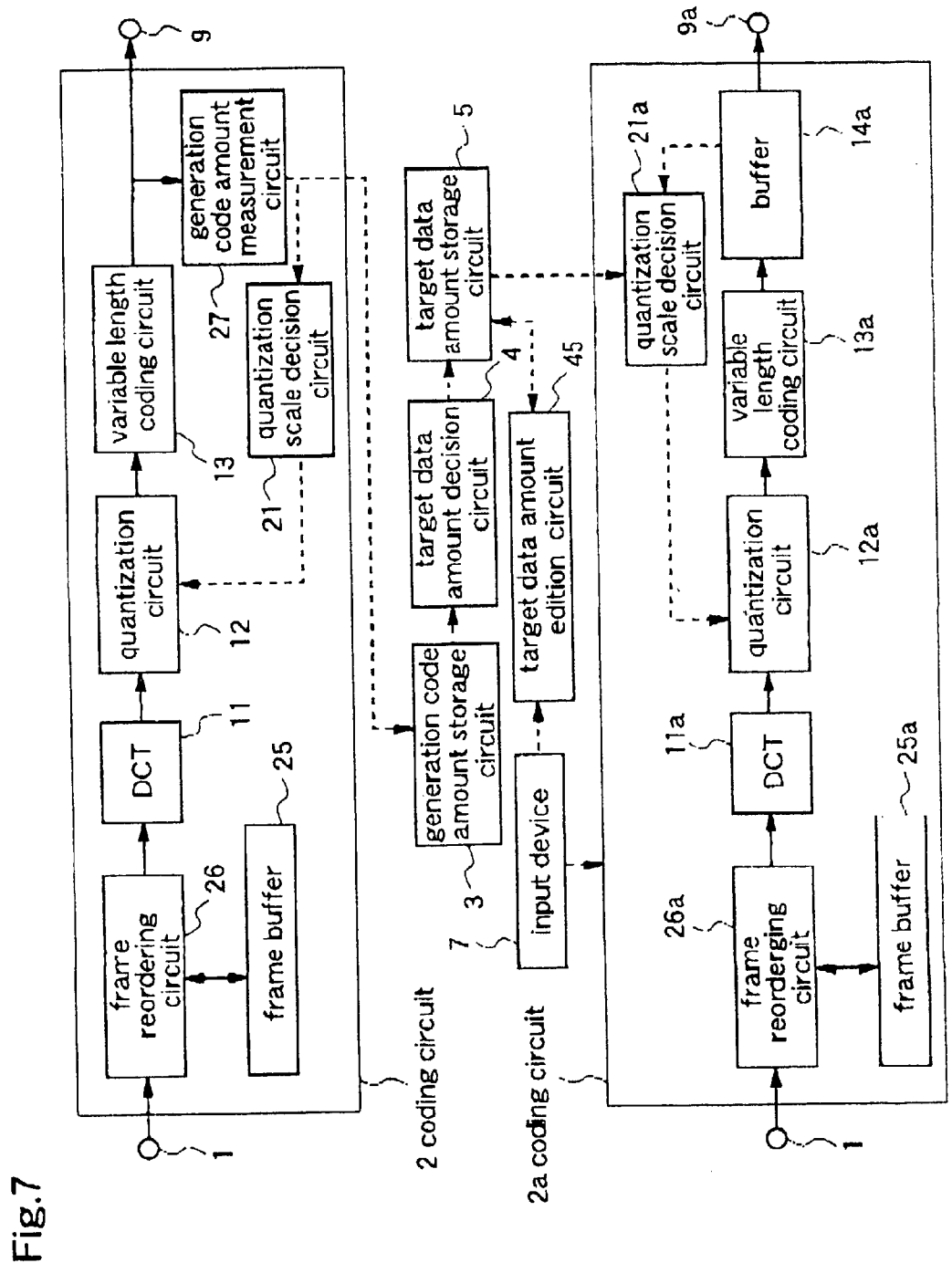
FIG. 7 is a block diagram illustrating a coding compression apparatus according to the fifth embodiment of the present invention.

FIG. 7 is a block diagram illustrating an example of a coding compression apparatus according to the fifth embodiment of the present invention.

This fifth embodiment is different from the first embodiment shown in FIG. 1 in that there is provided a target data amount edition circuit 45 which edits the target data amount of respective short section which are stored in a target data amount storage circuit 5- The target data amount edition circuit can indicate, by the operator, the partial section where the target data amount is to be changed and the change amount of the target data amount through an input means 7. The target data amount edition circuit 45 modifies the target data amount of the indicated section stored in a target data amount storage circuit 5 in accordance with the indicated amount.

Figure 8:
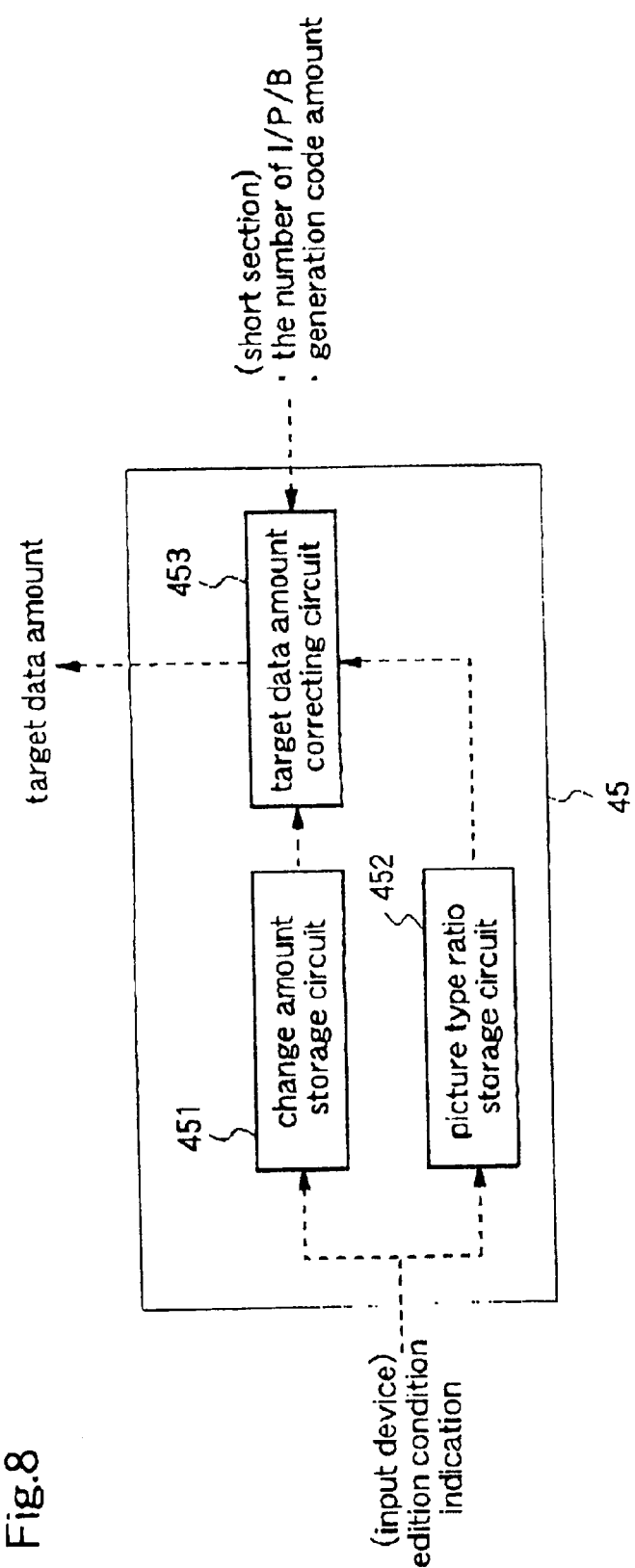
FIG. 8 is a block diagram illustrating a target data amount editing circuit according to the fifth embodiment of the present invention.

FIG. 8 is a block diagram illustrating an example of the target data amount edition circuit. A change amount storage circuit 451 stores the change amount of the target data amount indicated by the operator, a picture type ratio storage circuit 452 stores allocating ratio of target data amount for each picture type of I, P and B. The target data amount correcting circuit 453 corrects the target data amount by the use of the change amount, the allocating ratio, and GOP structure and the target data amount of the short section which are stored in the target data amount storage circuit 5.

The change amount storage circuit may be of a type that can indicate change amount of each picture type or a type that can indicate change amounts of other than a specified picture type. For example, it is possible to indicate change amount of I picture alone, and then changing allocating ratio of I picture alone while leaving allocating ratio between P and B picture the same, thereby to increase or decrease target data of I picture alone In addition, it is also possible to indicate modified amount of two kinds of picture type, P and B, and then changing suitably allocating ratio while leaving target data of I picture the same, thereby to increase or decrease target data amount of P and B pictures, In this way, the operator can modify the target data amount for the partial section for which no satisfactory video image quality could be obtained by an automatic allocation, whereby the spatial and temporal redundancy in setting the target data amount are reduced to enable an optimum coding.

(Embodiment 6)

Figure 9:
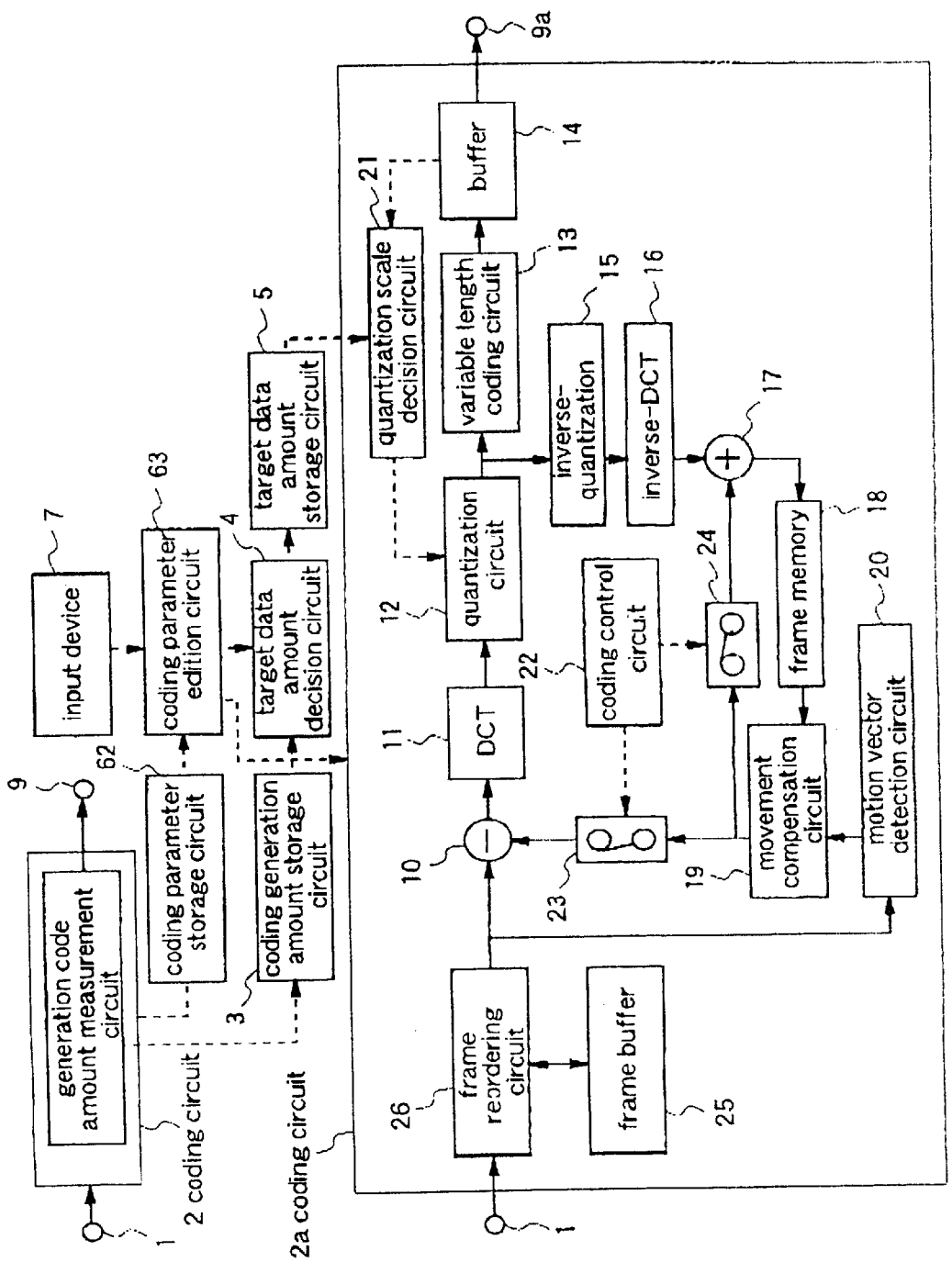
FIG. 9 is a block diagram illustrating a coding compression apparatus according to the sixth and seventh embodiment of the present invention.

FIG. 9 is a block diagram illustrating an example of a coding compression apparatus according to the sixth embodiment of the present invention. Compared with the first embodiment shown in FIG. 1, it further comprises; an input means 7, a coding parameter storage circuit 62, for storing a coding parameter including the GOP structure output from the coding circuit 2, and a coding parameter edition circuit 63, for editing a coding parameter.

The description of the sixth embodiment of the present invention will be described with reference to FIGS. 9, 10 and 11.

Figure 10:
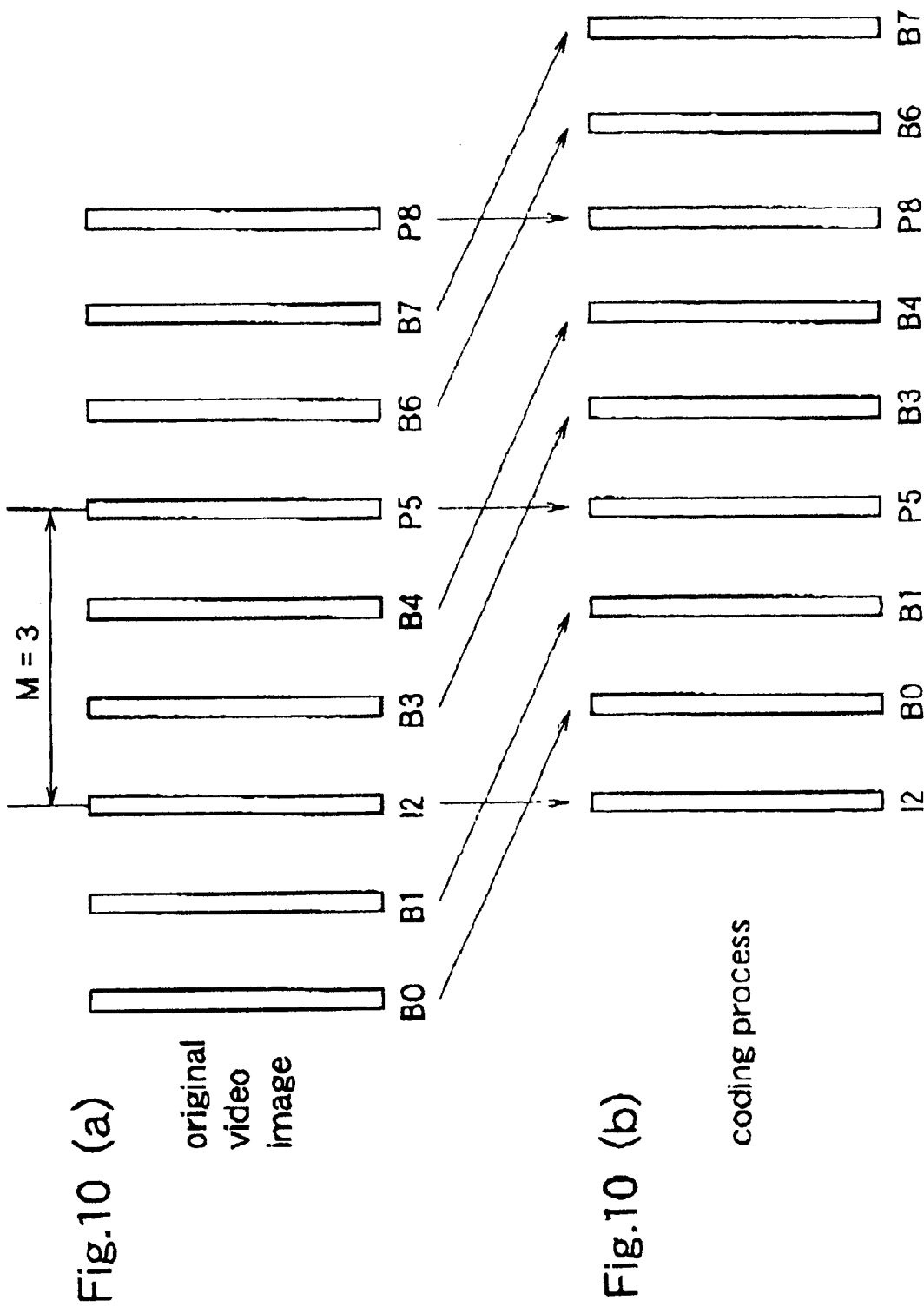
FIG. 10 is an explanatory drawing according to the Sixth embodiment of the present invention.
Figure 11:
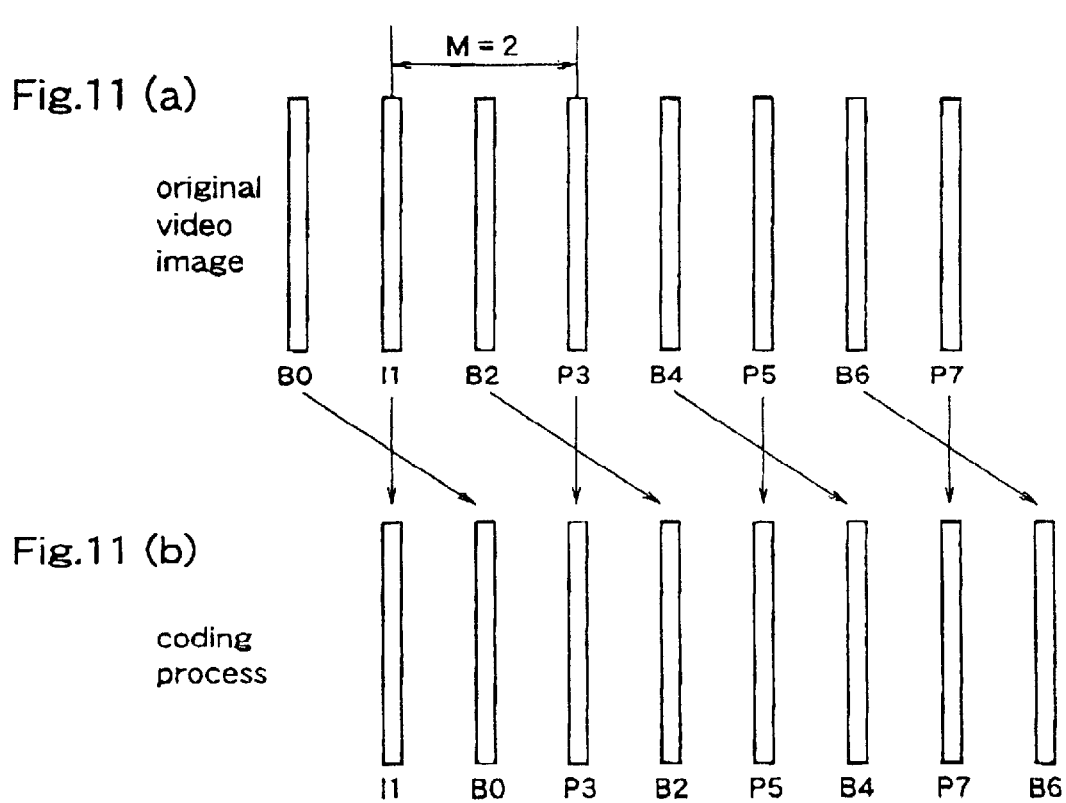
FIG. 11 is an explanatory drawing according to the third embodiment of the present invention.
Figure 13:
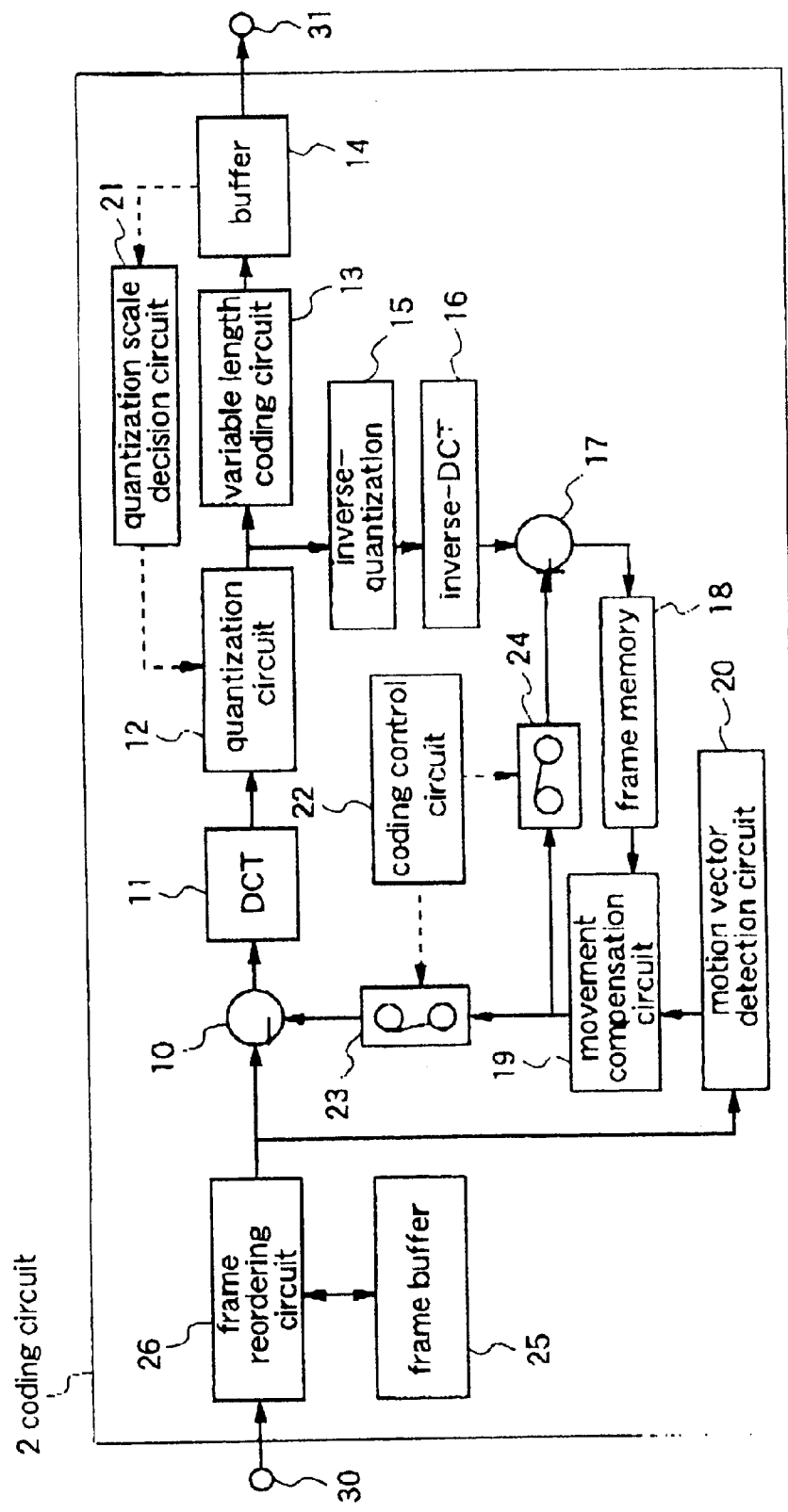
FIG. 13 is a block diagram of a general video image coding circuit
Figure 14:
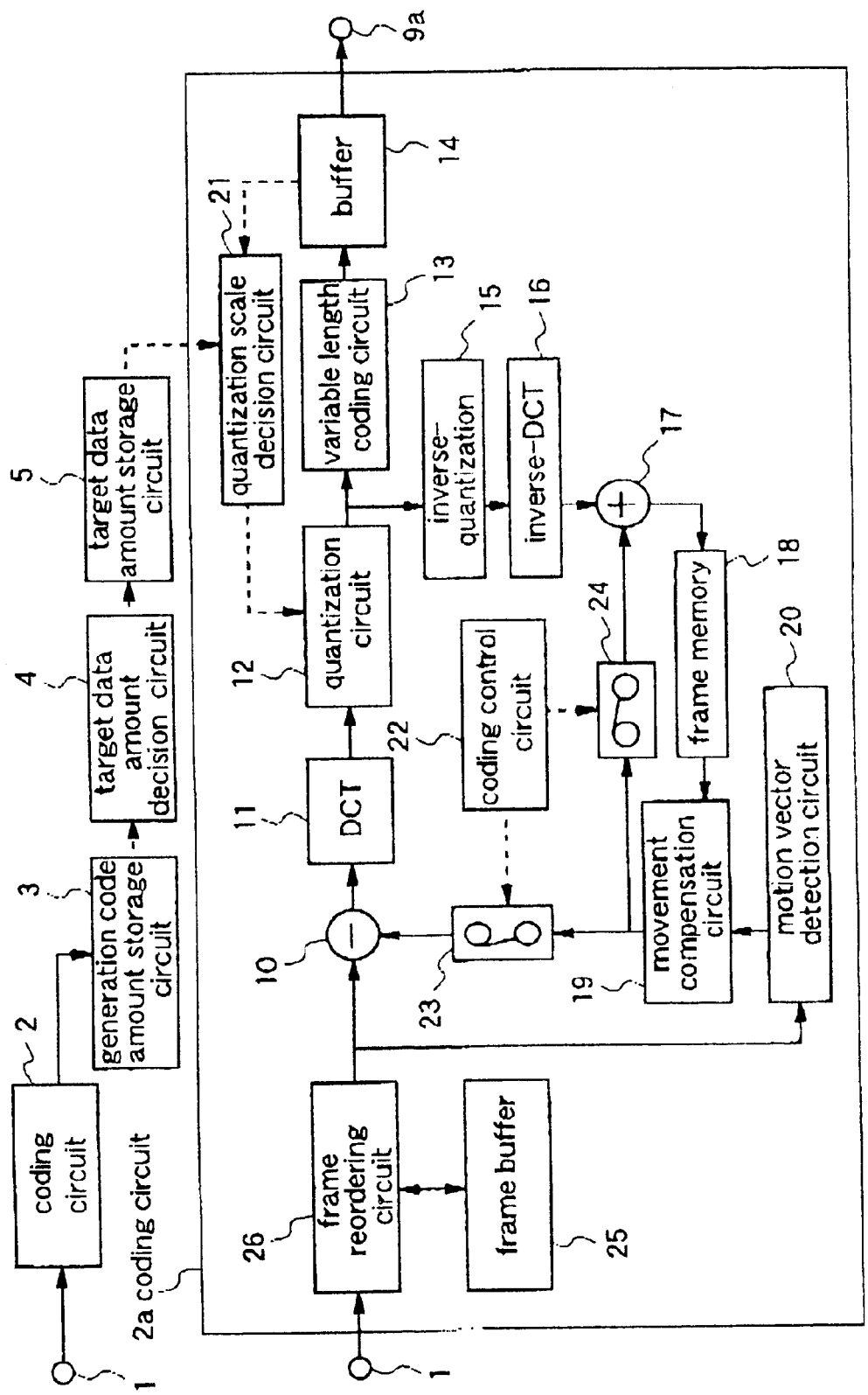
FIG. 14 is a block diagram of a conventional coding compression apparatus.
Figure 15:
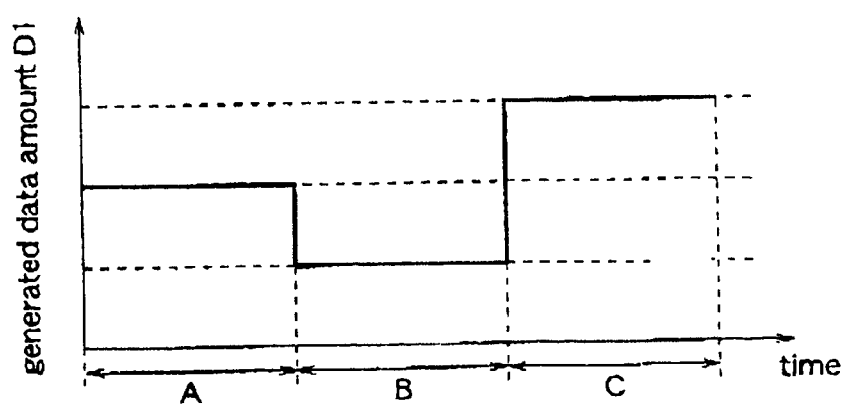
FIG. 15 is drawing explaining relation between the generated data amount and the target data amount.
Figure 15:
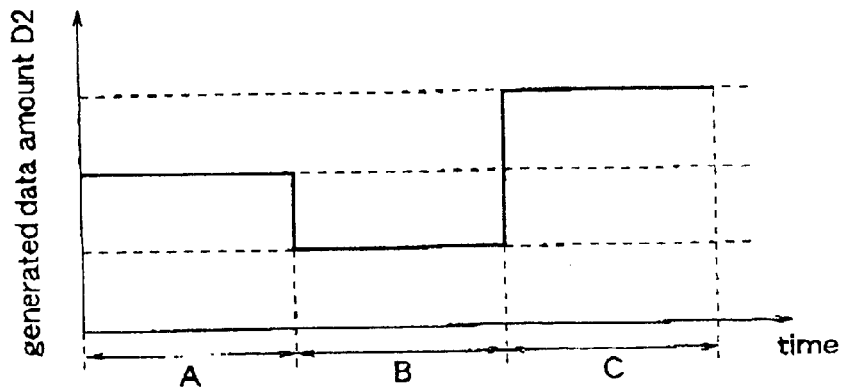

FIG. 10 shows a GOP structure of M=3, and FIG. 11 shows a GOP structure of M=2. Both FIGS. 10 and 11 show the order of frames of the original video image to be coded and the picture type thereof (I, P or B) in (a), and shows the order of frames for coding processing and the picture type thereof in (b) The value of M shows periods of I and P pictures.

Hereinafter, the sixth embodiment of the present invention will be described.

A first coding is performed with the GOP structure of M=3 shown in FIG. 10 by the cording circuit 2. In the frame reordering circuit 26, a coding process is performed with rearranging the frame order of the original video image in FIG. 10(*a*) to the frame order for coding process shown in FIG. 10(*b*). The coding parameter obtained in the first coding process is stored in the coding parameter storage circuit 62. The coding parameter stored in a coding parameter storage circuit 62 can be changed by an input through the input means 7, i.e., as an input indicating the value of M and the range thereof. For example, the coding parameter can be changed to the GOP structure of M=2 shown in FIG. 11. As a result, there may happen a frame whose picture type is different from the picture type obtained by the first coding process. For example, as such frame second frames of the original video image frame are shown in FIGS. 10 and 11(B1 frame in FIG. 10, I1 frame in FIG. 11).

The changed coding parameter is output to the target data amount decision circuit 4. In the target data amount decision circuit 4, the target data amount of a frame whose picture type is changed from the picture type in the first coding process is changed and decided in accordance with the change of the value of M.

There are at least two kinds of decision methods therefor. A first method is one employing the generation code amount obtained by the first coding process. More particularly, the generation code amount of the frame, which is to be decided here is calculated from the data generation amount of a frame which is the nearest to that frame and have the same picture type as that frame in the first coding process in the target data amount decision circuit 4.

A second method is to perform the same variable bit rate coding process as the first coding process with the GOP structure data based on the changed value of M to the range including the frame for which the coding parameter is changed by an input through the input means 7, and store the generation code amount similarly in the generation code amount storage circuit 3 and calculate the target data amount on the basis of the generation code amount.

The target data amount decision circuit 4 decides the target data amount for the second coding process by the above-described methods or by the other method.

The decided data amount is stored in the target data amount storage circuit 5. The coding parameter based on the modified value of M is stored in the coding parameter storage circuit 62.

The second coding process is to perform coding on the basis of the coding parameter from the coding parameter storage circuit 62 and the data amount from the target data storage circuit 5.

In the coding circuit 2*a*, a frame reordering circuit 26 and a coding control circuit 22 are controlled by the data from the coding parameter storage circuit 62 and the quantization circuit 12 is controlled by the data from the target data amount storage circuit 5

In this way, the operator can modify the target data amount accompanied by the change of GOP structure (value of M) for the partial section for no satisfactory video image quality could be obtained by an automatic allocation, thereby resulting in an optimum coding for visual characteristic for human being can be obtained.

(Embodiment 7)

When video image data is converted between a film of 24 pictures/second and a video image of 30 pictures/second, processing of television-cinema conversion converting a video image to a film, and inverse television-cinema conversion converting a film to a video image are-performed, The coding compression apparatus according to the seventh embodiment is different from the sixth embodiment shown in FIG. 9 in that in the block diagram of a coding compression apparatus in FIG. 9, the coding parameters output from the coding circuit 2 are stored in the coding parameter storage circuit 62 storing the coding parameter including the information of the inverse television-cinema conversion and the coding parameters are edited by the coding parameter edition circuit 63 in accordance with the input from the input means 7.

The seventh embodiment of the present invention will be described with reference to FIGS. 9 and 12

FIG. 12 shows the television-cinema conversion process -So and the inverse television-cinema conversion process. In the figure, (a) designates the original film video image, and the vertical line designates one frame of a film. (b), (c) and (d) designate the video image. In the figure, the numeral 1 designates a top field of the first frame, and the numeral 1' designates a bottom field of the first frame. The same designation does apply on and after the second frame. (b) designates a video image obtained by the film image of (a) being subjected to the television-cinema conversion, which is input to a coding means. (c) designates the result of the inverse television-cinema conversion which is performed to the video image of (b) as preprocessing of the coding processing. In the figure, TFF (Top Fast Field) and RFF (Repeat Fast Field) designate the frame structure which is subjected to inverse television-cinema conversion and coding processing, and in case of TFF=1, it means that the top field comprises a temporary fast field and in case of RFF=1, it means that the temporary fast field is repeated as a copy field. (d) designates the frame structure which is subjected to inverse television-cinema conversion and coding processing similarly as (c).

The first coding is performed in the coding circuit 2 by inverse television-cinema conversion process as shown in a FIG. 12(*c*). In the frame reordering circuit 26, the video image shown in the FIG. 12(*b*) is subjected to inverse television-cinema conversion as shown in (c). To be specific, the input video image is judged to be whether is a copy field or not, for each field of the same phase, on the basis of such as the difference information, and when it is a copy field, the field is made not to be output from the frame reordering circuit 26.

The coding parameter obtained by the first coding, i,e., the television-cinema pattern described as TFE and RFF in this seventh embodiment, is stored in the coding parameter storage circuit 62.

Next, the editing process in this seventh embodiment of the present invention is described.

The television-cinema pattern stored in the coding parameter storage circuit 62, is processed as follows. In case where the boundary of the scene is located between fields 3' and 4, and both fields are coded as a different frame, numeral 3 which is a copy field in (c) is changed to the television-cinema pattern so that it does not become a copy field by an input through the input means 7. That is, it is changed to a television-cinema pattern shown in (d).

As a result, different from the television-cinema pattern obtained in the first coding process, in case of (d), the frames to be coded increase, and there may happen a frame whose picture type is different from that of the frame in the first coding process.

The changed coding parameter, i,e., the result of the television-cinema pattern, is output to the target data amount decision circuit 4. In the target data amount decision circuit 4, at least the target data amount of the frame whose picture type is changed from the picture type in the first coding process by the change of television-cinema pattern is changed and decided.

There are at least two decision method therefor as in the sixth embodiment. A first method is one employing the data generated data amount obtained by the first coding process. More particularly, the target data amount of the frame, which is to be decided here is calculated, from the data generation amount of a frame which is the nearest frame to that frame and have the same picture type as that frame in the first coding process in the target data amount decision circuit 4.

A second method is to perform the same coding process with the GOP data structure based on the television-cinema pattern as the first coding process to the range including the frame for which the coding parameter is changed by an input from an input moans 7, store the generation code amount similarly in the generation code amount storage circuit 3, and calculate the target data amount on the basis of the generation code amount.

The target data amount decision circuit 4 decides the target data amount for the second coding process by the above-described two methods or by the other method.

The decided data amount is stored in the target data amount decision circuit 5. The coding parameter based on the changed television-cinema pattern is stored in the coding parameter storage circuit 63.

The second coding processing is to perform coding by the data including the coding parameter from the coding parameter storage circuit 63 and the data amount from the coding data storage circuit 5.

In the coding circuit 2a, a frame reordering circuit 26 and a coding control circuit 22 are controlled by the data from the coding parameter storage circuit 63, i,e., a television-cinema pattern here, and the quantization circuit 12 is controlled by the data from the target data amount storage circuit 5.

In this way, it is possible for the operator to modify the target data amount accompanied by the changing of television-cinema conversion pattern is performed for the partial section for which no satisfactory video image quality could be obtained by an automatic allocation, thereby the spatial and temporal redundancy in setting the target data amount can be reduced, resulting in an optimum coding.

In the present invention, it is also possible that the result of the second coding is again handled as the result of the first coding, and the editing processing of the target coding compression condition can be performed to carry out the second coding thereafter on the basis of the edited target coding compression condition.

In addition, the first coding and the second coding can be performed-by the same coding circuit.

Further, even when the first coding is not completely finished, the editing processing of the target coding compression condition can be performed to carry out the second coding thereafter.

In addition, in this embodiment of the present invention, the editing of inverse television-cinema conversion pattern is described, but as the editing of the target coding compression condition, editing of a plurality of conditions including quantization modulation intensity, quantization matrix, pixel level modulation, a motion vector detection condition and GOP structure may be performed.

What is claimed is:

1. A coding compression method for encoding a video image signal with a variable bit rate, comprising:

performing coding to said video image signal for each predetermined coding unit in accordance with a predetermined first coding parameter, which coding is completed within said coding unit, thereby generating a first coded stream;

creating a second coding parameter of said video image signal for each said predetermined coding unit while creating said first coded stream;

indicating a partial section of said first coded stream, said partial section comprising said predetermined coding units;

editing said second coding parameters corresponding to said partial section of said first coded stream;

performing coding to said video image signal of said partial section of said first coded stream in accordance with said edited second coding parameters thereby to produce a second coded stream; and replacing a partial section of said first coded stream with at least a partial section of said second coded stream, said partial section of said second coded stream corresponding to said partial section of said first coded stream.

2. The coding compression method of claim 1, wherein;

said first and said second coded streams each comprises an MPEG stream and said predetermined coding unit comprises a closed Group of Picture, which is coded without referring to previous and behind coding units.

3. The coding compression method of claim 1, wherein;

said second coding parameter comprises at least one of modulation intensity of quantization step, quantization matrix, degree of modulation of pixel level, search range of motion vector, detection condition of motion vector and target code amount of said video image signal.

4. The coding compression method of claim 1, wherein;

said first and said second coded streams each comprises an MPEG stream, said MPEG stream comprises a plurality of pictures type having different prediction methods and, the editing step for editing said second coding parameter corresponding to said indicated partial section is a step for editing only the second coding parameter of the MPEG stream of a particular picture type among said plurality of picture types.

5. The coding compression method of claim 1, wherein;

said first and said second coding parameters each comprises an MPEG stream and, said second coding parameter comprises a GOP structure.

6. The coding compression method of claim 1, wherein;

said first and said second coded streams each comprises an MPEG stream which is generated by a video image signal which is subjected to a television-cinema conversion being subjected to a reverse television-cinema conversion including a copy field and, said second coding parameter is an information at least indicating a field of said vide image signal which is made a copy field.

7. A coding compression apparatus comprising:

a first coding means for performing coding to said video image signal for each predetermined coding unit in accordance with a predetermined first coding parameter, which coding is completed within said predetermined coding unit, thereby to generate a first coded stream;

a coding parameter creating means for creating a second coding parameter of said video image signal for each said predetermined coding unit while creating said first coded stream;

an indicating means for indicating a partial section of said first coded stream comprising said predetermined coding units;

an editing means for editing said second coding parameter corresponding to said indicated partial section;

a second coding means for performing coding to said video image signal of said indicated partial section of said second coded stream in accordance with said edited second coding parameter thereby to generate a second coded stream; and a replacing means for replacing at least a partial section of said first coded stream with at least a partial section of said second coded stream, said partial section of said second coded stream corresponding to said partial section of said first coded stream.

8. The coding compression apparatus of claim 7, wherein;

said first and said second coded streams each comprises an MPEG stream and said predetermined coding unit comprises a closed Group of Picture, which is coded without referring to previous and behind coding units.

9. The coding compression apparatus of claim 7, wherein;

said second coding parameter comprises at least one of modulation intensity of quantization step, quantization matrix, degree of modulation of pixel level, search range of motion vector, detection condition of motion vector and target data amount of said video image signal.

10. The coding compression apparatus of claim 7, wherein;

said first and said second coded streams each comprises an MPEG stream and said MPEG stream comprises a plurality of pictures type having different prediction methods, and the editing step for editing said second coding parameter corresponding to said indicated partial section is a step for editing only the second coding parameter of the MPEG stream of a particular picture type among said plurality of picture types.

11. The coding compression apparatus of claim 8, wherein;

said first and said second coding parameters each comprises an MPEC stream and said second coding parameter comprises a GOP structure.

12. The coding compression apparatus of claim 7, wherein;

said first and said second coded streams each comprises an MPEG stream which is generated by a video image signal which is subjected to a television-cinema conversion being subjected to a reverse television-cinema conversion including a copy field, and said second coding parameter is an information at least indicating a field of said vide image signal which is made a copy field.

* * * * *